United States Patent Office 3,520,648
Patented July 14, 1970

3,520,648
PROCESS FOR DYEING ORGANIC POLYESTER FIBERS AND COMPOSITE ANTHRAQUINONE PREPARATIONS THEREFOR
Alfred Staub, Binningen, Switzerland, assignor to J. R. Geigy A.G., Basel, Switzerland
No Drawing. Filed Dec. 11, 1967, Ser. No. 689,333
Claims priority, application Switzerland, Dec. 22, 1966, 18,377/66
Int. Cl. D06p 1/20
U.S. Cl. 8—25    13 Claims

ABSTRACT OF THE DISCLOSURE

Process for dyeing organic polyetser fibers with composite dyes consisting of mixtures of a 4-(3'- or 4'-carbamoylphenylamino)-8-nitro-anthrarufin and a 4-phenylamino- or 4-toluylamino-8-nitro-anthrarufin, preferably in a molar ratio of from 4:1 to 1:4 or with dye preparations containing such composite dyes, whereby unexpectedly equally good deep blue shades are obtained on cellulose ester fibers, acetate silk or triacetate fibers, on the one hand, and on fibers made of polyester of aromatic dicarboxylic acid, e.g. Terylene, on the other hand.

DESCRIPTION OF THE INVENTION

The present invention concerns a process for the dyeing of organic polyester material, dye preparations used therefore, novel composite dyes present as coloring component in such compositions, as well as, as industrial products, organic polyester materials dyed therewith.

In general, fibres made of polyester materials have only a slight affinity for dyestuffs. Most of the dyestuffs developed for cellulose acetate draw badly onto fibres made from polyesters of aromatic dicarboxylic acids such as polyethylene glycol terephthalate, or they produce dyeings thereon most of which are insufficiently fast to sublimation. In reverse, dispersion dyestuffs which dye materials made of polyesters of aromatic dicarboxylic acids satisfactorily can seldom be used for the dyeing of cellulose acetate, in particular cellulose-2½-acetate (acetate silk) or cellulose triacetate. There is, therefore, a great demand for dyestuffs or dye preparations which have good drawing power both onto cellulose acetate and also polyester material made from aromatic dicarboxylic acids, particularly onto substantially oriented aromatic polyester material, and which produce dyeings on these materials which, in addition, have good fastness to sublimation.

It has now been found that, surprisingly, organic polyester material, regardless of whether it is made from cellulose acetate fibers or from polyesters of aromatic dicarboxylic acids, can be dyed very satisfactorily in blue shades when a dye preparation is used which contains, as coloring component, a novel composite dye which is a mixture of at least one finely distributed dyestuff falling under the formula

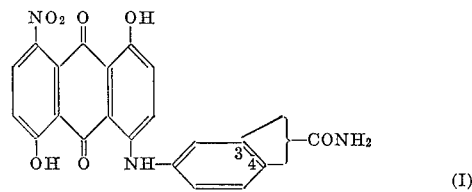

(I)

and at least one other finely distributed dyestuff falling under the formula

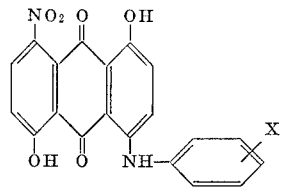

(II)

wherein X preferably represents hydrogen or, also, the methyl group.

The dyeings obtained with the novel composite dyes or the dye preparations according to the invention containing such composite dyes have good color strength and are fast to sublimation, gas fading and light.

Dye preparations according to the invention are compositions containing the aforesaid composite dyes in mixture with dye assistants, which are compatible with said dye and with the dyeing of the aforesaid fiber materials, and contains in addition to the said dyeing components, advantageously the auxiliaries usual in dyeing polyester fibers such as wetting agents, dispersing agents, protective colloids and, if desired, also diluting agents.

The composite dyes according to the invention are obtained by dissolving dyestuffs of the Formula I and II, in desired ratio, depending somewhat on the type of fiber to be dyed, and the dyeing procedure employed in a water-miscible solvent, followed by precipitation from the dyestuff mixture by adding the solution dropwise to water while stirring vigorously, and isolation, e.g. by filtration and drying. The composite dyes are shimmering, deeply colored substances.

Both organic as well as inorganic solvents are usable as water miscible solvents. Particularly suitable organic solvents are, e.g. dialkylamides of lower aliphatic monocarboxylic acids, in particular dimethyl or diethyl formamide or dimethyl acetamide; especially suitable inorganic solvents are strong inorganic acids, preferably 80–95% sulphuric acid.

After precipitation with water, isolation and, optionally drying, the composite dyes are milled together with dispersing agents by known processes to form powders or aqueous pastes, i.e. the dye preparations usable according to the invention.

It is also possible, however, to produce the dye preparations according to the invention by milling the dyestuffs of Formulae I and II in the desired weight ratio with dispersing agents in an apparatus suitable therefor, e.g., in a ball mill.

Wetting or dispersing agents suitable for the dye preparations according to the invention are, e.g. surface active non-ionogenic polyglycol ethers of higher fatty alcohols such as dodecyl alcohol polyglycol ether having 10 and more ether groups, or the polyglycol ethers of alkyl phenols having a higher molecular alkyl radical, particularly an alkyl radical containing 8 to 12 carbon atoms, e.g. nonylphenol polyglycol ethers having 3 and more ether groups, or condensation products of polyalkylene oxide and fatty acid, e.g. condensation products of oleic acid and about 20 mols of ethylene oxide. However, anion active wetting or dispersing agents are preferred, e.g. dinaphthylmethane disulphonic acid or alkylnaphthalene sulphonic acids such as dibutylnaphthalene sulphonic acid, preferably in the form of their alkali metal salts, also however, sulphite waste liquor (aqueous solution of the sodium salt of lignin sulphonic acid) or solid lignin sulphonates obtained therefrom.

In addition to the wetting or dispersing agents mentioned, the dye preparations usable according to the invention can also contain, e.g. dextrin, British gum or water soluble proteins as protective colloids for the aqueous suspensions, and water soluble, non-ionogenic extenders such as urea, starch, sugar or cellulose methyl ether.

The weight ratio of the dyestuffs to the other solid components in the dye preparation is about 1:9 to 9:1, preferably about 1:3 to 3:1.

In the composite dyes according to the invention, the weight ratio of the dyestuff of Formula I to that of Formula II is about 4:1 to 1:4 and, preferably, about 2:1. If the dyestuff mixture contains three or more dyestuffs then it is advantageous if the sum of the first type to the sum of the second type is in the weight ratio given.

Dye liquors according to the invention are obtained by dispersing dye preparations according to the invention in water and, optionally, also mixing additional amounts of dispersing agents and/or other auxiliaries into the dye liquor. The components, in a suitable order and amount, can also be added individually to form the dye liquors according to the invention, but this method produces somewhat less strongly coloured dyeings than when the dye preparations according to the invention are used.

Particularly valuable dye preparations according to the invention which are distinguished by affording deep and fast dyeings contain, as composite dye, a mixture of the finely distributed dyestuffs of Formulae Ia and IIa

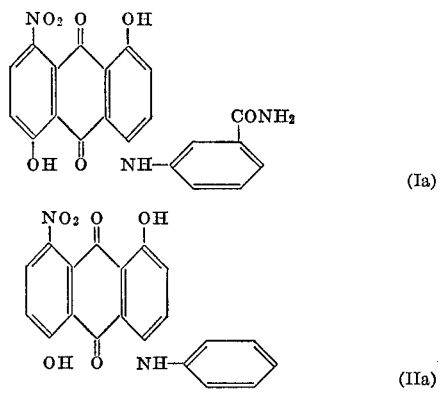

in a weight ratio of about 3:1 to 1:3, in particular 2:1.

Organic polyester materials which can be dyed according to the invention in deep shades comprise fibre material in any stage of processing made from cellulose esters such as cellulose-2½-acetate, or cellulose triacetic, from esters of aromatic dicarboxylic acids with polyfunctional alcohols, namely polyethylene glycol terephthalates, polyethylene glycol isophthalates or from poly-(1,4-cyclohexane-dimethylol terephthalate), and in particular, also materials made from substantially oriented polyester which is difficult to dye.

The latter polyester material is advantageously dyed with the dye preparations according to the invention at temperatures of 90–100° C., optionally in the presence of carriers such as trichlorobenzene, halogenated or hydroxylated diphenyls, particularly, however, of o-phenylphenol; optionally the dyed goods are after-treated with hot air about 180° C.

Dyeing can also be performed under pressure in a closed vessel and at temperatures of 100–140° C., preferably at 125–135° C.; another method consists in pad dyeing the goods with the dye suspensions according to the invention in a pad dyeing liquor and then heating the impregnated material at temperatures of about 180 to 250° C., preferably at 220° C. A weight ratio of 1:1 to 1:4 of dyestuff Ia to dyestuff IIa in the composite dye is recommended when employing this dyeing method.

Cellulose ester fiber material, i.e. cellulose-2½-acetate, is dyed at temperatures of 60 to 90° C., advantageously at about 80 to 85° C.

Compared with dyeings attained under otherwise the same conditions with individual dyestuffs of Formula I or II, respectively, the blue dyeings on cellulose ester material attained with the dyestuff mixtures according to the invention are distinguished by a remarkable depth of shade. Surprisingly, the amount of the mixture of dye components taken up the fiber is greater than the sum of the individual dyestuffs I and II taken up by the fiber under otherwise the same conditions. In addition, dyeings produced in accordance with the invention have excellent fastness to sublimation and gas fading. Another advantage of the dye preparations according to the invention is that they are suitable for use in the so-called permanent press process. In this process, the dyestuffs is fixed at the same time as the anti-creasing or permanent pleating is performed at temperatures up to 200° C., and this is only possible because of the high fastness to sublimation mentioned. In this way, perfectly level, blue dyeings which are fast to rubbing are obtained without difficulty. In addition, the apparatus is not soiled.

The following non-limitative examples serve to illustrate the invenion. The temperatures are given in degrees centigrade. Percentages are given by weight.

EXAMPLE 1

Dyeing onto polyethylene glycol terephthalate fabric 3 g. of a dye preparation, consisting of 0.5 g. of finely distributed dyestuff of Formula Ia

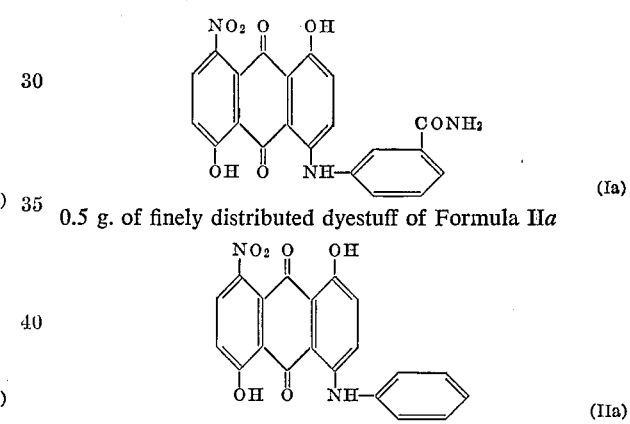

0.5 g. of finely distributed dyestuff of Formula IIa 1 g. of sodium salt of lignin sulphonic acid and 1 g. of dinaphthylmethane disulphonic acid, are dispersed in 4000 ml. of water. 2 g. of sodium salt of dinaphthylmethane disulphonic acid, 20 g. of diammonium phosphase and 20 g. of sodium salt of o-phenylphenol are also added to this dispersion and 100 g. of polyethylene glycol terephthalate fabric are dyed in this bath by heating to 95–98° for 1½ hours. The dyeing is then rinsed, washed for 20 minutes at 90° in 2000 ml. of a 0.03 N sodium hydroxide solution which contains 2 g. of dodecyl polyglycol ether as dispersing agent, and then thermofixed by a subsequent hot air treatment at 180°. A deep blue dyeing which is fast to light, wet and sublimation is obtained.

(a) The dye preparation used in the example is obtained by milling 1 g. of the dyestuff Ia and 1 g. of the dyestuff IIa with 2 g. of soduim salt of lignin sulphonic acid and 2 g. of sodium salt of dinaphthylmethane disulphonic acid in the presence of a little water and a milling auxiliary consisting of quartz sand until the average particle size is 1 micron. The finely dispersed suspension obtained is separated by sieving off the quartz sand and drying in vacuo. A blue dye preparation which can easily be dispersed in water is obtained in this way.

(b) On using a dye preparation which consists of 3 g. of dyestuff Ia and 1 g. of dyestuff IIa, or 2 g. of dyestuff Ia and 1 g. of dyestuff IIa and corresponding amounts of auxiliaries mentioned under (a), which preparation is produced by the method described under (a), blue dyeing having similar properties are obtained on the fibres mentioned.

(c) Dye preparations according to the invention can also, be produced by dissolving the amounts mentioned above of the two dyestuffs Ia and IIa together in 15 g. of concentrated 90% sulphuric acid at 15° and then adding the solution dropwise to 300 g. of ice water while stirring strongly. The precipitated dyeing component is filtered off, washed neutral with water and then milled with 9 g. of sodium salt of lignin sulphonic acid, 3 g. of dinaphthylmethane disulphonic acid and a milling auxiliary for 5 hours until the particle size is about 1 micron. After removal of the milling auxiliary (glass balls), the finely dispersed suspension is sprayed from an atomising dryer to form a powder.

(d) Preferred dye pastes according to the invention are obtained by milling 20 g. of a mixture of dyestuffs Ia and IIa in a ratio of 3:1 together with 2 g. of cellulose methyl ether, 68 ml. of water and 200 g. of quartz sand. After milling for 48 hours, an average paritcle size of 1–2 microns is attained. The milling auxiliary (quartz sand) is removed from the finely dispersed suspension obtained. 10 g. of glycerin are added thereto and the mixture is stirred until a homogeneous liquid paste is formed. This paste is excellently suitable for the production of thickened pad dyeing liquors for the homogeneous pad dyeing of polyethylene glycol terephthalate fabric.

(e) Pasty dye preparations are also obtained by dissolving 20 g. of the dyestuff Ia and 10 g. of the dyestuff IIa together in 150 g. of warm dimethyl formamide and adding the solution to 500 ml. of cold water while stirring well. The precipitated product is filtered off, washed with water and the filter residue is milled with 10 g. of sodium salt of lignin sulphonic acid and 150 g. of glass beads for 6 hours. The milling auxiliary is sieved off and, by adding a further amount of sodium salt of lignin sulphonic acid and glycerin, the suspension is brought to the following composition:

|   | Percent |
| --- | --- |
| Dyestuff mixture | 30 |
| Sodium salt of lignin sulphonic acid | 18 |
| Glycerin | 6 |
| Water | 46 |

This pasty dye preparation is particularly well suited for the dyeing of aromatic polyester material in the presence of carriers (carrier process), the high temperature process or the thermosol process. It is also very well suited for incorporation into printing pastes for the printing of polyethylene glycol terephthalate fabrics.

EXAMPLE 2

Dyeing of polyethylene glycol terephthalate fabric 3 g. of a dye preparation which contains a mixture of the two dyestuffs of formulae Ib and II b

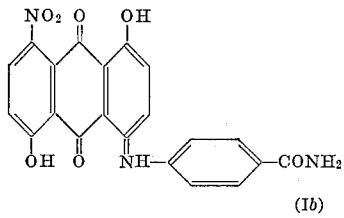

(Ib)

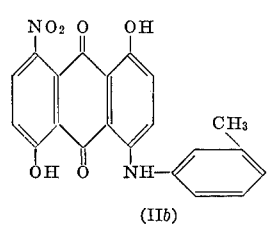

(IIb)

in a ratio of 1:1 as dyeing component and which otherwise is produced as described in Example 1 (paragraph a), are dispsersed in 4000 ml. of water. 2 g. of sodium salt of dinaphthylmethane disulphonic acid, 20 g. of diammonium phosphate and 20 g. of sodium salt of o-phenylphenol (carrier) are added to this dispersion and 100 g. of polyethylene glycol terephthalate fabric are dyed in this dyebath by heating at 95–98° for 1½ hours. The dyeing is then rinsed, washed with 2000 ml. of a 0.03 N sodium hydroxide solution which contains 2 g. of dodecyl polyglycol ether as dispersing agent, for 20 minutes at 90° and then thermofixed by a hot air treatment at 180°. A deep blue dyeing is obtained which is fast to light, wet and sublimation.

EXAMPLE 3

Dyeing onto celluose-2½-acetate (acetate silk)

4 g. of a dye preparation according to Example 1 (c) are dispersed in 4000 ml. of 45° warm water which contains 8 g. of oleic acid-N-methyl-1-tauride. 100 g. of celluose-2½-acetate fabric are introduced, the temperature is raised to 80° within half an hour and is kept there for 1 hour. The goods are then rinsed and dried.

A deep blue dyeing which has excellent fastness to gas fading is obtained.

Instead of 4 g. of the dye preparation described in Example 1 (c), also 3 g. of the paste described in Example 1 (e) can be used.

EXAMPLE 4

Dyeing onto cellulose triacetate fabric 3 g. of a dye preparation according to Example 1 (a) are dispersed in 4000 ml. of water which contains 2 g. of sodium salt of dinaphthylmethane disulphonic acid. 100 g. of cellulose triacetate fabric are dyed with this liquor for 1½ hours at the boiling temeprature. After rinsing, a deep blue dyeing is obtained which has very good fastness to sublimation.

EXAMPLE 5

High temperature dyeing of oriented polyethylene glycol terephthalate yarn 7 g. of a dye preparation according to Example 1 (a) are dispersed in 2000 ml. of water which contains 2 g. of sodium salt of dinaphthylmethane disulphonic acid. The pH of the dispersion is adjusted to 5.5 with acetic acid. 100 g. of substantially oriented polyethylene glycol terephthalate yarn (Terylene) are introduced at 40°, the bath is heated in a closed vessel under pressure to 130° within 15 minutes and is kept at this temperature for 45 minutes. After rinsing, the dyeing is soaped at the boil. In this way, a deep blue dyeing which is fast to sublimation is obtained.

If, instead of the pulverulent dye preparation according to Example 1 (a), corresponding amounts of the pasty product according to Example 1 (d) are used then, with otherwise the same method as given in the example, a deep blue dyeing which has similar properties is obtained.

EXAMPLE 6

High temperature dyeing of polyethylene glycol terephthalate yarn in the form of a cheese 250 g. of yarn made of substantially orientated polyethylene glycol terephthalate, cross-wound on a bobbin, are heated in a closed vessel at 130° for 1 hour in a liquor (liquor ratio 1:35) which, per litre of water, contains 0.5 g. of oleic acid-N-methyl tauride, 0.5 g. of sodium salt of dinaphthylmethane disulphonic acid, 2 g. of ammonium sulphate and 42 g. of the pulverulent dye preparation according to Example 1 (c). The pressure rises to about 3 atm. abs. pressure. After cooling, the cheese is soaped at the boil in a bath which contains, per litre, 1 g. of a mixture of lauric acid diethanolamide and a condensation product of diamylphenol and ethyleneoxide. A completely homogeneous, intensive blue dyeing is obtained which has excellent fastness to rubbing, sublimation and light.

If instead of the 42 g. of the pulverulent dye preparation according to Example 1 (c), 35 g. of a pasty preparation according to Example 1 (d) are used then, with otherwise the same procedure as given in the example, a deep blue dyeing having similar properties is obtained.

EXAMPLE 7

Dyeing of polyethylene glycol terephthalate fabric by the thermosol process 50 g. of the pasty dye preparation according to Example 1 (d) are finely dispersed in a pad dyeing liquor which, per litre, contains 200 g. of a 2.5% sodium alginate solution as thickener, also 2 g. of sodium salt of 1-butylnaphthalene sulphonic acid, 2 g. of ammonium sulphate and 0.1 ml. of formic acid. 10 g. of polyethylene glycol terephalate fabric are pad dyed with this liquor, squeezed out to a content of 60% and dried at 100°. The dyestuff is then fixed for 90 seconds by a dry heat treatment at 210°. The dyeing is then rinsed and soaped at the boil in a bath which contains, per litre, 2 g. of a mixture of lauric acid diethanolamide and a condensation product of diamylphenol and ethyleneoxide. A level, deep blue dyeing is obtained which is fast to sublimation.

A dyeing having similar properties is obtained on using corresponding amounts of a pulverulent dye preparation according to Example 1 (a) instead of the 50 g. of pasty dye preparation according to Example 1 (d), or a pulverulent dye preparation containing the individual dyestuffs Ia and IIa in the weight ratios of 1:2, 1:3 or 1:4 respectively.

I claim:

1. A process for the dyeing of a fiber material consisting essentially of cellulose esters or esters of aromatic dicarboxylic acids with polyfunctional alcohols in strongly colored, fast blue shade, comprising dyeing said fiber material with a composite dye consisting essentially of at least one finely distributed dyestuff of the formula

[Structure I: anthraquinone with NO2, OH, OH, NH-phenyl-CONH2]

and at least one finely distributed dyestuff of the formula

[Structure II: anthraquinone with NO2, OH, OH, NH-phenyl-X]

wherein X represents hydrogen or methyl.

2. A processs as described in claim 1, wherein said composite dye consists of the dyestuff of Formula I in which the carbamoyl group is in the 3-position of the benzene ring, and the dyestuff of Formula II in which X represents hydrogen.

3. A process as defined in claim 1, wherein said fiber material consisting essentially of cellulose esters is cellulose 2½-acetate fiber material.

4. A process as defined in claim 1, wherein said fiber material consisting essentially of cellulose esters is cellulose triacetate fiber material.

5. A process as defined in claim 1, wherein said fiber material consisting essentially of esters of aromatic dicarboxylic acids with polyfunctional alcohols is polyethylene glycol terephthalate fiber material.

6. A process as described in claim 1, wherein the weight ratio of the dyestuff of Formula I to that of Formula II in said composite dye ranges from about 3:1 to 1:3.

7. A dye preparation comprising a composite dye being a mixture of a dyestuff of the formula

[Structure I]

and a dyestuff of the formula

[Structure II]

wherein X represents hydrogen or the methyl group, and carrier compatible with said composite dye and with the dyeing of fiber material consisting essentially of cellulose esters or esters of aromatic dicarboxylic acids with polyfunctional alcohols therewith, and wherein the content of said composite dye ranges from about 10% to 90% by weight calculated on the total weight of the preparation.

8. A dye preparation as defined in claim 7, wherein said composite dye is a mixture of the dyestuff of the formula

[Structure I with CONH2]

and the dyestuff of the formula

[Structure II]

9. A dye preparation as defined in claim 7, wherein the weight ratio of the dyestuff of Formula I to that of Formula II ranges from about 4:1 to 1:4.

10. A composite dye consisting essentially of a dyestuff of the formula

[Structure I]

and a dyestuff of the formula

[Structure II]

wherein X represents hydrogen or the methyl group.

11. A composite dye as defined in claim 10, wherein the dyestuff of Formula I has the carbamoyl group in 3-position at the benzene nucleus and X in the dyestuff of Formula II represents hydrogen.

12. A composite dye as defined in claim 10, wherein the weight ratio of the dyestuff of Formula I to that of Formula II ranges from about 3:1 to 1:3.

13. A fiber material consisting essentially of cellulose esters or esters of aromatic dicarboxylic acids with polyfunctional alcohols dyed with a composite dye as defined in claim 10.

References Cited

UNITED STATES PATENTS

| | | | |
|---|---|---|---|
| 2,506,020 | 5/1950 | Grossman et al. | 8—25 |
| 2,766,262 | 10/1956 | Belshaw | 260—376 X |

FOREIGN PATENTS 749,114  5/1956  Great Britain.

NORMAN G. TORCHIN, Primary Examiner

P. C. IVES, Assistant Examiner

U.S. Cl. X.R.

8—39, 179